W. E. WOODARD.
CAR TRUCK.
APPLICATION FILED AUG. 27, 1908.
918,809.
Patented Apr. 20, 1909.
2 SHEETS—SHEET 2.
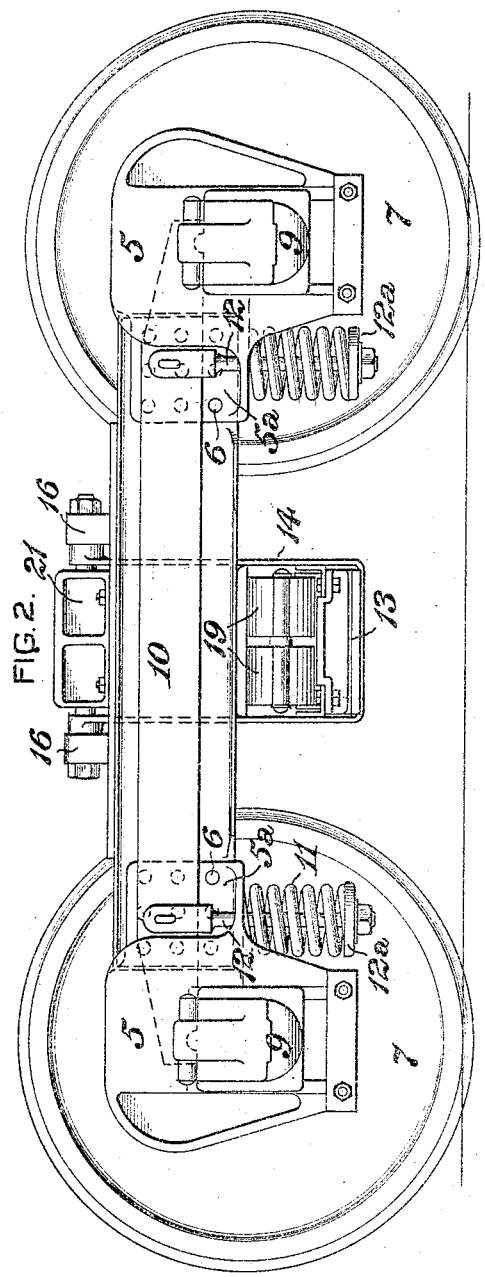
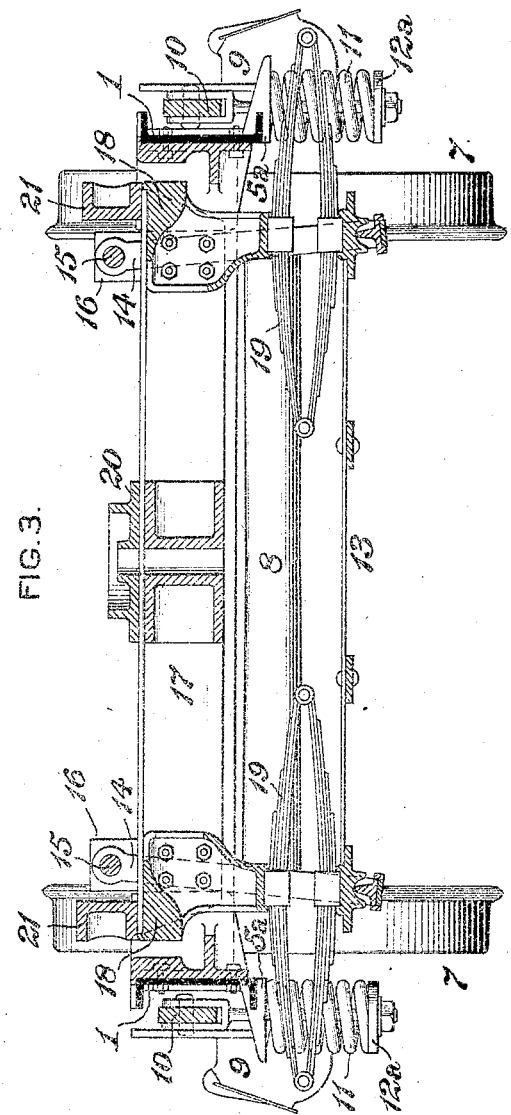
WITNESSES
James C. Herron.
S. R. Bell.
INVENTOR
Wm. E. Woodard,
by
Att'y.

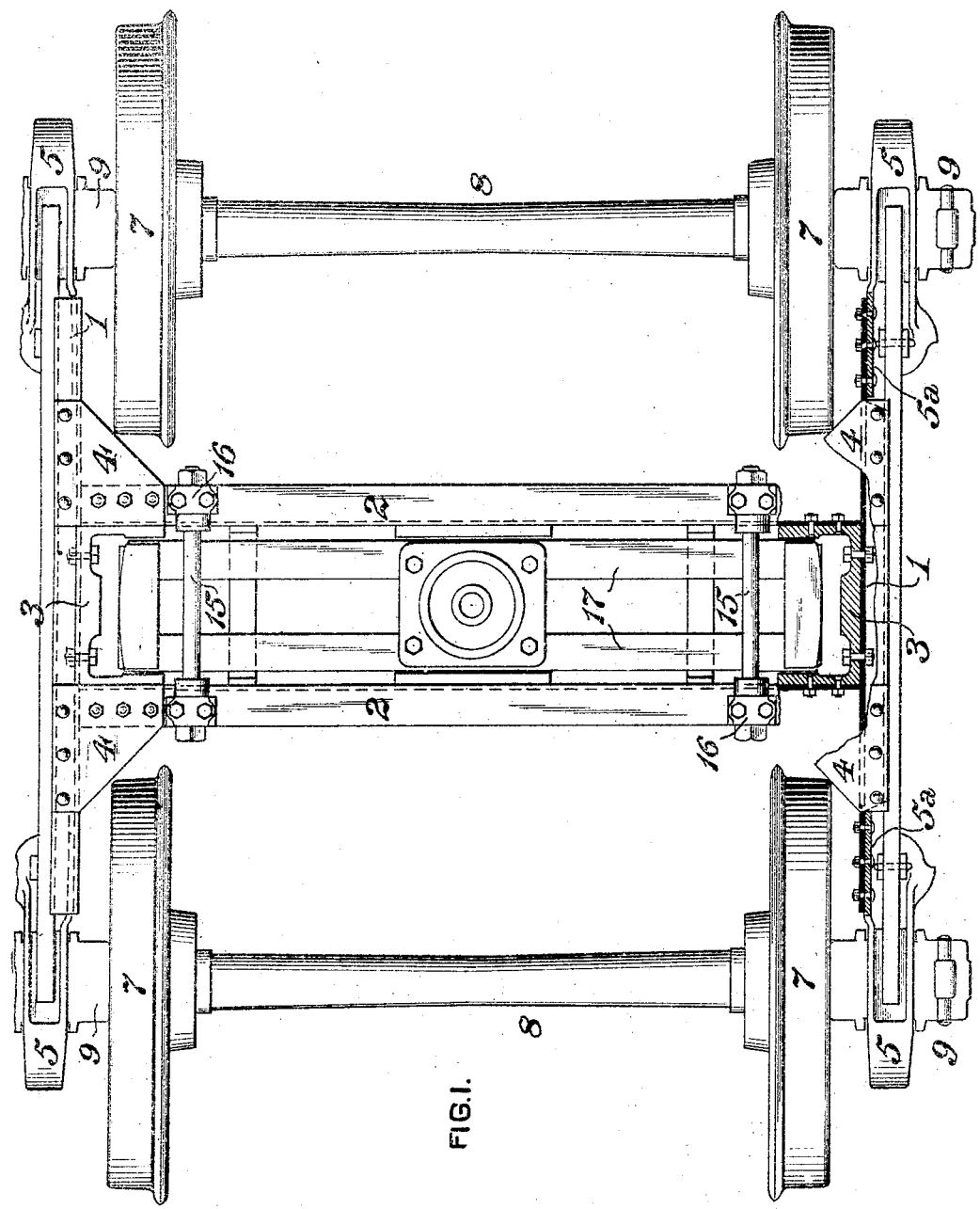

UNITED STATES PATENT OFFICE.

WILLIAM E. WOODARD, OF SCHENECTADY, NEW YORK, ASSIGNOR TO AMERICAN LOCOMOTIVE COMPANY, OF NEW YORK, N. Y., A CORPORATION OF NEW YORK.

CAR-TRUCK.

No. 918,809.　　　Specification of Letters Patent.　　Patented April 20, 1909.

Application filed August 27, 1908. Serial No. 450,407.

*To all whom it may concern:*

Be it known that I, WILLIAM E. WOODARD, of Schenectady, in the county of Schenectady and State of New York, have invented a certain new and useful Improvement in Car-Trucks, of which improvement the following is a specification.

My invention relates to car trucks of the "Master Car Builders'" type, and its object is to provide a truck of such type which shall be of simplified construction and avoid the use of the bent equalizer forgings heretofore usually found necessary.

The improvement claimed is hereinafter fully set forth.

In the accompanying drawings: Figure 1 is a plan or top view, partly in section, of a car truck embodying my invention; Fig. 2, a side view, in elevation, of the same, and; Fig. 3, a transverse central section.

In the practice of my invention, I provide a truck frame composed of two straight side members, 1, of channel section, and two transoms, 2, of angle section, connecting the side members one to the other, on opposite sides of the transverse central plane of the truck. The transoms are secured to the side members through the intermediation of filling castings, 3, the webs of which are bolted to the side members, and which have lateral flanges bolted to the transoms. The transoms and side members are also connected by gussets, 4, secured to them by vertical bolts. The lower flanges of the side members, 1, are cut away at and adjoining their ends, and pedestals, 5, are connected to the side members at the portions thereof where said flanges are cut away, by bolts, 6, passing through flanges, 5ª, on the sides of the pedestals, toward the middle of the truck. As shown in Figs. 2 and 3, the flanges 5ª, are of angle section, their vertical portions abutting against and being secured to the side frame members, and their horizontal portions serving as upper bearings for the equalizer springs hereinafter described.

The truck is supported on wheels, 7, fixed on axles, 8, which are journaled in axle boxes, 9, fitting in the pedestals, 5, which, with the truck frame to which they are connected, are movable vertically, relatively to the axle boxes, on which they are supported by equalizers, 10. The equalizers, 10, are straight bars of rectangular section, which extend longitudinally between the flanges of the side frame members and rest, at their ends, on the tops of the axle boxes, and, in turn, support the side members through the intermediation of helical equalizer springs, 11. The equalizer springs are coiled around spring rods, 12, connected at their upper ends to, and depending from, the equalizers, and abut, at their upper ends, against the horizontal portions of the flanges, 5ª, of the pedestals, and, at their lower ends, against spring seats, 12ª, fitted on the spring rods.

A spring plank, 13, is suspended from the transoms, 2, by swing hangers, 14, journaled on swing hanger pivots, 15, which are fitted in swing hanger pivot bearings, 16, on the tops of the transoms. A swing bolster, 17, composed of two parallel bars of angle section, which are connected by end castings, 18, is supported on the spring plank by semi-elliptic bolster springs, 19, two pairs of which are interposed between the spring plank and each of the end castings, 18, of the bolster. The webs of the filling castings, 3, of the transoms, serve as end stops for the bolster and wear plates for the adjacent end castings thereof. A center casting, 20, and side bearings, 21, of the ordinary form, are secured to the bolster, at its middle and ends, respectively.

The form and relation of the side members and pedestals above described are such as to simplify the construction and minimize the number of parts of the truck frame, and attain the further substantial advantage of enabling straight equalizers to be applied, instead of those having upwardly bent ends, as heretofore employed in trucks of the M. C. B. type. The forgings for equalizers of the latter form are more complicated and difficult to make, and are subject to the risk of injury in bending, from which the straight equalizers are exempt.

I claim as my invention and desire to secure by Letters Patent:

1. In a car truck, the combination of two side frame members of channel section, having their lower flanges cut away at and near their ends, transoms connecting said side frame members, pedestals having lateral flanges of angle section, the vertical portions of which abut against and are secured to the side frame members on the portions thereof at which their lower flanges are cut away, axle boxes fitting in said pedestals, straight bar equalizers extending longitudinally between the flanges of the side frame members and bearing on the axle boxes, and equalizer springs bearing at their ends on the equalizers and on the horizontal portions of the pedestal flanges, respectively.

2. In a car truck, a pedestal having a lateral flange of angle section, the vertical portion of which serves for connection to a side frame member and the horizontal portion as a seat or bearing for an equalizer spring.

WILLIAM E. WOODARD.

Witnesses:
 CHAS. J. ROGERS,
 V. G. SWEET.